United States Patent [19]

McCandless

[11] Patent Number: 5,614,874
[45] Date of Patent: Mar. 25, 1997

[54] PACKAGE INTEGRATED PLANAR MONOPULSE COMPARATOR

[75] Inventor: Jay H. McCandless, Issaquah, Wash.

[73] Assignee: The Boeing Company, Seattle, Wash.

[21] Appl. No.: 567,968

[22] Filed: Dec. 6, 1995

[51] Int. Cl.$^6$ .................................................... H01P 5/16
[52] U.S. Cl. ...................... 333/125; 333/137; 333/21 R; 333/122
[58] Field of Search ................................. 333/117, 122, 333/125, 137; 342/149, 427

[56] References Cited

U.S. PATENT DOCUMENTS

| | | |
|---|---|---|
| 3,274,604 | 9/1966 | Lewis . |
| 3,670,268 | 6/1972 | Connerney .......................... 342/427 X |
| 3,758,880 | 9/1973 | Mörz ..................................... 333/122 |
| 3,918,011 | 11/1975 | Salzberg ................................ 333/122 |
| 4,721,959 | 1/1988 | Syrigos ................................ 342/427 X |
| 5,202,648 | 4/1993 | McCandless . |

OTHER PUBLICATIONS

M/A–COM: "AK–10050 Slotted Array 35.0 GHz Antenna," Bulletin No. 1704.
ALPHA, "Miniaturized Millimeter Wave Monopulse Comparator Feed Assembly," Millimeter Wave Components & Subsystems, pp. 5–53.
Howard, D.D., "Single Aperture Monopulse Radar Multi–Mode Antenna Feed and Homing Device.".

Primary Examiner—Paul Gensler
Attorney, Agent, or Firm—Christensen, O'Connor Johnson & Kindness, PLLC

[57] ABSTRACT

A monopulse comparator receives an incoming RF signal through a multimode antenna and splits it into a first-half signal that corresponds to the incoming RF signal as received by one half of the antenna and a second-half signal that corresponds to the incoming RF signal as received by the other half of the antenna. A folded magic tee selectively separates an unsymmetric mode component signal and a symmetric mode component signal from the first-half signal. In one embodiment, the unsymmetric mode component signal is the $TE_{2,0}$ mode and the symmetric mode component signal is the $TE_{1,0}$ mode. The energy of the $TE_{2,0}$ mode signal is dependent on $\Delta AZ$ information of the incoming RF signal relative to the antenna's boresight. The $TE_{1,0}$ mode contains the $\Sigma$ and $\Delta EL$ signals. A second folded magic tee selectively separates the corresponding unsymmetrical and symmetrical mode component signals of the second-half signal. Waveguide-to-microstrip transition circuits transition the $TE_{2,0}$ mode component signals from the two folded magic tees to provide the $\Delta AZ$ signal to microstrip. A third magic tee, coupled to the two folded magic tees, separates the $\Delta EL$ and $\Sigma$ signals from the $TE_{1,0}$ mode component signals. Two waveguide-to-microstrip transition circuits transition the $\Delta EL$ and $\Sigma$ signals from the third magic tee to microstrip. Each magic tee includes matching-probes to match the ports of the magic tee. Each matching-probe includes a hole that causes the magic tee to have a lower return loss in the magic tee's sum port.

23 Claims, 5 Drawing Sheets

Fig. 9B

PACKAGE INTEGRATED PLANAR MONOPULSE COMPARATOR

FIELD OF THE INVENTION

The present invention relates to monopulse antenna systems and, more particularly, to multimode monopulse comparators for use in a monopulse antenna system.

BACKGROUND OF THE INVENTION

Figure 1:
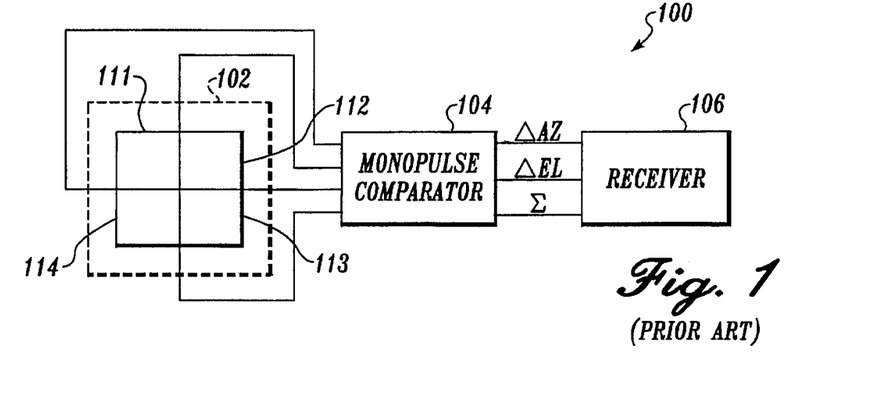
FIG. 1 is a block diagram of a conventional monopulse antenna system.

FIG. 1 shows a block diagram of a phase-comparison monopulse antenna system 100. Monopulse antenna system 100 includes an antenna 102 and a monopulse feed or comparator 104 that operate to determine the angle of an incoming radio frequency (RF) signal relative to the boresight of antenna 102. As shown in FIG. 1, antenna 102 is divided into four quadrants 111–114. Monopulse comparator 104 detects the relative phase differences of the incoming RF signal as received in each quadrant, and provides signals indicative of the relative phase differences to a receiver 106. Typically, the monopulse comparator provides an azimuth phase difference signal ($\Delta AZ$), an elevation phase difference signal ($\Delta EL$), and a sum signal ($\Sigma$). Receiver 106 uses the $\Delta AZ$ and $\Delta EL$ signals to determine the elevation and azimuth angles of the incoming RF signal relative to the boresight of antenna 102. The $\Sigma$ signal represents the incoming RF signal received by antenna 102 as a whole (i.e, a portion of the RF signal as received by all of the quadrants is summed and provided as the $\Sigma$ signal). The signals from the monopulse comparator are typically transmitted to the receiver by waveguides. Receiver 106 typically includes waveguide-to-stripline or waveguide-to-coaxial transitions to transition the waveguide propagated signals to stripline or coaxial signals.

Figure 2:
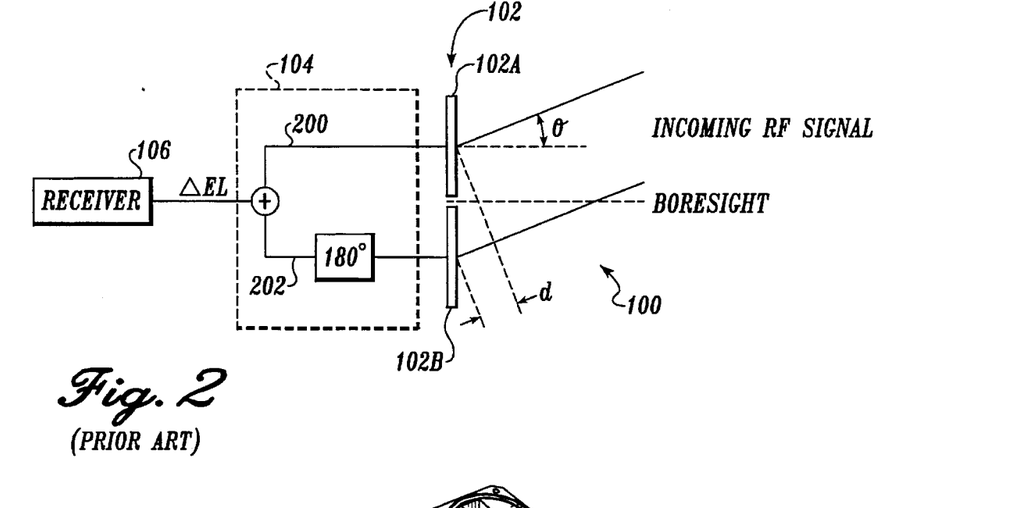
FIG. 2 is a block diagram diagrammatically illustrating a conventional monopulse antenna system detecting the elevation difference signal.

FIG. 2 diagramatically illustrates antenna system 100 providing the $\Delta EL$ signal from the incoming RF signal. In this conventional monopulse antenna system, monopulse comparator 104 feeds a portion of the incoming RF signal as received by the upper half 102A (i.e., sums the incoming RF signals as received by quadrants 111 and 112 in FIG. 1) of antenna 102 along a channel 200. Concurrently, monopulse comparator 104 feeds a portion of the incoming RF signal as received by the lower half 102B (i.e., sums the incoming RF signals as received by quadrants 113 and 114 in FIG. 1) of antenna 102 along a channel 202. If the incoming RF signal is at an elevation angle of $\theta$ from the boresight, then the incoming RF signal must travel an extra distance d to reach the lower half 102B. As a result, there is a difference in phase between the RF signal as received by upper half 102A and the RF signal as received by lower half 102B. In addition, monopulse comparator 104 introduces a 180° phase shift into the lower half signal at channel 202 and then sums the signals propagated in channels 200 and 202 to provide the $\Delta EL$ signal. Consequently, monopulse comparator 104 in effect subtracts the RF signal as received from lower half 102B from the RF signal as received by the upper half 102A.

For example, when the incoming RF signal is aligned in elevation with the antenna's boresight, the summed signal from the upper two quadrants has substantially the same phase as the summed signal from the lower quadrants and, thus, the 180° phase shifted signal from the lower two quadrants substantially cancels the summed signal from the upper two quadrants. Consequently, the power of the $\Delta EL$ signal is substantially zero. However, if the incoming RF signal is at an elevation angle $\theta$ with the boresight, then the signals from the upper and lower halves do not cancel each other, and the $\Delta EL$ signal will have some power. The ratio of the power of the $\Delta EL$ signal to the power of the $\Sigma$ signal is proportional to elevation angle $\theta$.

Similarly, monopulse comparator 104 simultaneously provides the $\Delta AZ$ signal by phase shifting a portion of the incoming RF signal as received by the left half of antenna 102 (i.e., summing the incoming RF signal as received by quadrants 111 and 114 in FIG. 1) and summing this phase shifted signal with a portion of the incoming RF signal as received by the right half of antenna 102 (i.e., summing the incoming RF signal as received by quadrants 112 and 113 in FIG. 1).

Figure 3:
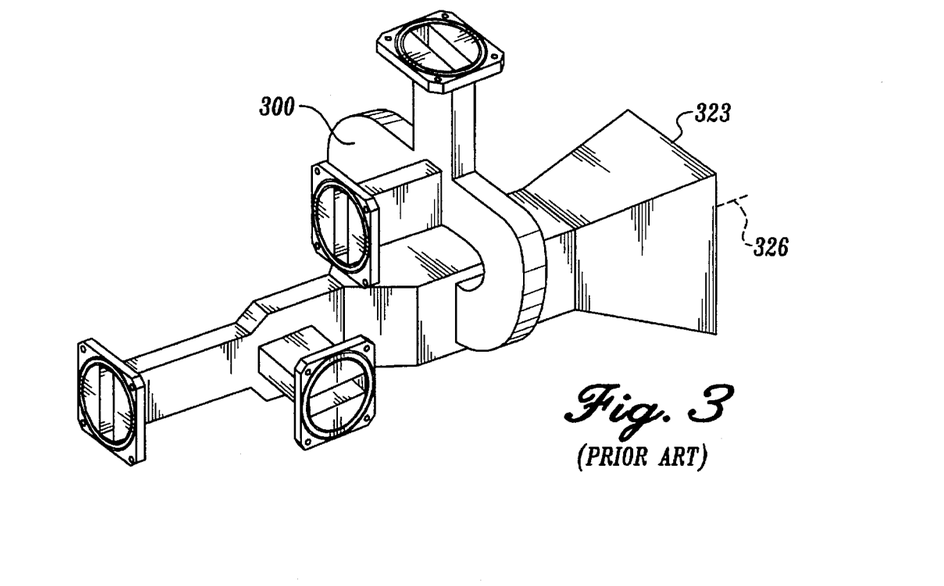
FIG. 3 is a top perspective of a conventional monopulse antenna system.

FIG. 3 shows a conventional monopulse comparator 300 with a horn antenna 323. The boresight of horn antenna 323 is indicated by a broken line 326. As can be seen, monopulse comparator 300 has several waveguide feeds, a substantial portion of which lie in a plane parallel to or containing the boresight of horn antenna 323, which is referred to herein as a nonplanar-configuration. Monopulse comparators with a nonplanar-configuration are relatively large, thereby increasing the size and thickness of the monopulse antenna system. Further, monopulse comparators with a nonplanar-configuration are relatively costly to fabricate and may be impractical or impossible to fabricate for applications above 75 GHz.

In applications that require small size and/or thickness, a monopulse comparator with a configuration having substantially all of the monopulse comparator's waveguides lying within a single plane perpendicular to the boresight of the antenna can be used (i.e., a planar-configuration). However, conventional monopulse comparators with a planar-configuration are relatively expensive and operate at a narrow bandwidth. For example, one 35 GHz planar monopulse comparator currently available uses a split block waveguide assembly with 90° short slot hybrids and 90° phase-shifters. At 35 GHz, the short slot hybrids have narrow walls that make machining difficult and expensive. Further, this comparator uses relatively long interconnecting waveguides that increase the area of the monopulse comparator and make matching the waveguide lengths more difficult. Moreover, the 90° hybrids and 90° phase-shifters used are generally accurate for only a single frequency, thereby decreasing the bandwidth of the monopulse comparator. This monopulse comparator currently costs approximately $5,000.

SUMMARY OF THE INVENTION

According to the present invention, a monopulse comparator is provided for use with an antenna capable of supporting propagation of a multimode incoming radio frequency (RF) signal. The term "multimode" is used herein to refer to the various transverse electric (TE) wave modes, such as the $TE_{1,0}$, $TE_{2,0}$ and the other higher order TE wave modes. One embodiment of the monopulse comparator includes a first coupler. The first coupler receives the incoming RF signal from a first multimode waveguide (i.e., capable of supporting propagation of a multimode signal) extending between the antenna and the first coupler. The first coupler splits the incoming RF signal into a first-half signal that corresponds to the incoming RF signal as received by one half of the antenna and a second-half signal that corresponds to the incoming RF signal as received by the other half of the antenna. The first coupler also bends the first-half and second-half signals 90° to propagate the first-half and second-half signals to a second multimode waveguide and a third multimode waveguide respectively.

The monopulse comparator also includes a second coupler that is connected to the opposite end of the second multimode waveguide. In this embodiment, the second coupler is a magic tee. The second coupler selectively propagates a signal that is dependent on an unsymmetrical mode component signal of the first-half signal. In this embodiment, the second coupler extracts the $TE_{2,0}$ mode component signal of the first-half signal from the first-half signal while letting the $TE_{1,0}$ mode component signal pass through the second coupler. The $TE_{2,0}$ mode, in this embodiment, contains ΔAZ information (i.e., the power of the $TE_{2,0}$ mode signal is dependent on the horizontal or transverse angle of the incoming RF signal relative to the antenna's boresight), whereas the $TE_{1,0}$ mode contains the Σ and ΔEL information. Similarly a third coupler substantially identical to the second coupler is connected to the opposite end of the third multimode waveguide to selectively propagate the corresponding unsymmetrical mode component signal of the second-half signal.

Magic tees have a symmetrical configuration which, when well matched, maintain excellent isolation between feeds. Further, magic tees operate over a bandwidth limited only, in general, by the bandwidth of the waveguides implementing the magic tee, which is typically an octave. Because magic tees are used in the second and third couplers, the two $TE_{2,0}$ mode signals have superior isolation with respect to the Σ signal over a broad frequency range compared to the 90° hybrids used in some conventional planar monopulse comparators. The two $TE_{2,0}$ mode signals can then be combined in whatever manner desired to extract the ΔAZ information.

A fourth waveguide is coupled to the second coupler and is of reduced size to propagate only the $TE_{1,0}$ mode component signal of the first-half signal that is passed through the second coupler. The fourth waveguide propagates this $TE_{1,0}$ mode component signal to one of the feeds of a fourth coupler. Similarly, a fifth waveguide substantially similar to the fourth waveguide (but in mirror image) propagates the $TE_{1,0}$ mode component signal of the second-half signal to another feed of the fourth coupler. The fourth coupler is a magic tee, which separates the Σ and the ΔEL signals from the $TE_{1,0}$ mode signals received from the fourth and fifth waveguides.

In another embodiment, a substrate including waveguide-to-trace transition circuits is attached to the second, third and fourth couplers. In a preferred embodiment, the waveguide-to-trace transition circuits are waveguide-to-microstrip transition circuits. By transitioning the waveguide signals to microstrip in the monopulse comparator, the size and thickness of the monopulse comparator can be reduced. In addition, the receiver need not have waveguide-to-microstrip transition circuits, thereby reducing the complexity and cost of the receiver.

Some conventional magic tees include a matching-probe to facilitate matching of the magic tee's sum and difference ports to reduce return loss. In another embodiment of the present invention, each magic tee includes a matching-probe with a hole. The hole in the matching-probe causes the magic tee to have a much lower return loss in the magic tee's sum port, compared to magic tees with conventional matching-probes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 4:
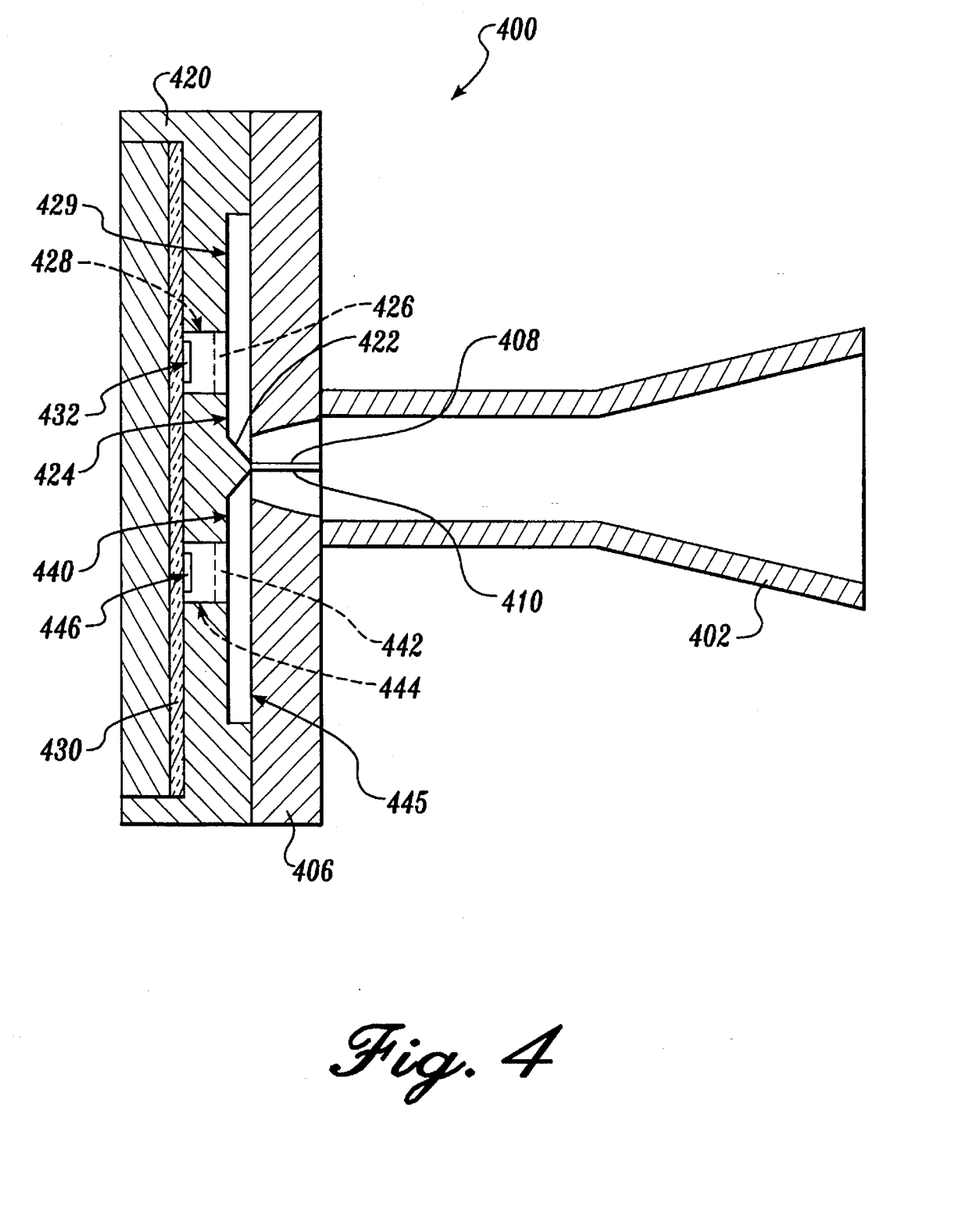
FIG. 4 is a vertical section of a monopulse comparator and horn according to one embodiment of the present invention.

FIG. 4 shows a vertical section of a monopulse comparator 400 according to one embodiment of the present invention. A multimode horn and waveguide 402 is fixed to monopulse comparator 400, whereby the incoming RF signal is received and propagated to monopulse comparator 400. In this embodiment, monopulse comparator 400 is intended for 8–140 GHz applications.

Monopulse comparator 400 includes a cover 406 upon which horn 402 is fixed. In this embodiment, cover 406 is machined from a metal plate, such as, for example, aluminum or an aluminum alloy. The metal plate is suitably coated to reduce corrosion. A tapered waveguide 408 with a septum 410 is formed in cover 406. Septum 410 is horizontally aligned with the boresight of horn 402 to split the incoming RF signal into a first-half signal corresponding to the portion of the incoming RF signal received by the upper half of horn 402 and a second-half signal corresponding to the portion of the incoming RF signal received by the lower half of horn 402. Each "half" of septumized waveguide 408 supports multimode energy propagation.

Cover 406 is attached to a surface of a housing 420. Housing 420 is made from a metal plate, preferably of the same metal as cover 420 to have matched thermal characteristics. A knife-edge 422 with a taper of approximately 45° in cross-section is recessed in housing 420 and aligned with septum 410. Knife-edge 422, cover 406 and septum 410 serve as a coupler to respectively bend the propagation paths of the first-half signal and the second-half signal approximately +90° and −90° (measured vertically from the boresight of horn 402) so that the first-half signal and the second-half signal propagate in a plane that is approximately parallel to the aperture of horn 402.

An oversized waveguide 424 is formed by forming a recess (described below in conjunction with FIG. 5B) in the surface of housing 420 that faces cover 406, with one wall of oversized waveguide 424 formed by cover 406. Waveguide 424 extends from the upper side of knife-edge 422 to propagate the first-half signal from waveguide 408.

Oversized waveguide 424 is sized to support energy propagation of the $TE_{1,0}$ and $TE_{2,0}$ modes and, thus, is "oversized" relative to waveguides sized to support propagation of only the $TE_{1,0}$ mode (i.e., typically, waveguides are sized to propagate only the $TE_{1,0}$ mode in many rectangular waveguide applications).

A $TE_{2,0}$ mode coupler 426 is connected to the opposite end of oversized waveguide 424. $TE_{2,0}$ mode coupler 426 propagates the $TE_{2,0}$ mode component signal of the first-half signal to a port 428 and allows the $TE_{1,0}$ mode component signal of the first-half signal to pass to a curved waveguide 429 connected to $TE_{2,0}$ mode coupler 426. Waveguide 429 is sized to support propagation of only $TE_{1,0}$ mode signals.

A circuit substrate 430 is fixed in a recess in housing 420 and includes a waveguide-to-microstrip transition circuit 432 aligned with port 428 of $TE_{2,0}$ mode coupler 426. Waveguide-to-microstrip transition circuit 432 can be any type of conventional waveguide-to-microstrip transition circuit. One embodiment of waveguide-to-microstrip transition circuit 432 is disclosed in U.S. Pat. No. 5,202,648 issued to the present inventor on Apr. 13, 1993, and is herein incorporated by reference in its entirety. As a result, the energy of $TE_{2,0}$ mode component signal of the first-half signal is propagated in a microstrip connected to waveguide-to-microstrip transition circuit 432 (described below in conjunction with FIG. 8). The $TE_{2,0}$ mode component signal contains the $\Delta AZ$ information (described below in conjunction with FIG. 5B).

Symmetrically, an oversized waveguide 440, matched with oversized waveguide 424, extends from the lower side of knife-edge 422 to propagate the second-half signal from waveguide 408. A $T_{2,0}$ mode coupler 442, substantially similar to $TE_{2,0}$ mode coupler 426, is connected at the opposite end of oversized waveguide 440 to propagate the $TE_{2,0}$ mode component signal of the second-half signal to a port 444 and allow the $TE_{1,0}$ mode component signal to pass through to a curved transitional waveguide 445. Circuit substrate 430 includes a waveguide-to-microstrip transition circuit 446, substantially similar to waveguide-to-microstrip transition circuit 432, connected to port 444 of $TE_{2,0}$ mode coupler 442. Waveguides 424 and 440 are approximately 0.440 inches in width and approximately 0.112 inches in height to support propagation of the $TE_{2,0}$ mode component signals at approximately 35 GHz. Ports 428 and 444 and waveguides 429 and 445 are approximately 0.224 inches in width and 0.112 inches in height (i.e., size WR22 waveguide).

Because of the uncomplicated design of this embodiment of the present invention, monopulse comparator 400 is integrated in a package formed by cover 406, housing 420 and circuit substrate 430, which contain all of the circuitry and waveguides implementing monopulse comparator 400. As a result, monopulse comparator 400 is smaller and less complex (and thus, less costly) relative to conventional planar monopulse comparators of comparable performance. In addition, the smaller size of monopulse comparator 400 makes it suitable for high performance applications where small size and weight are critical.

Figure 5A:
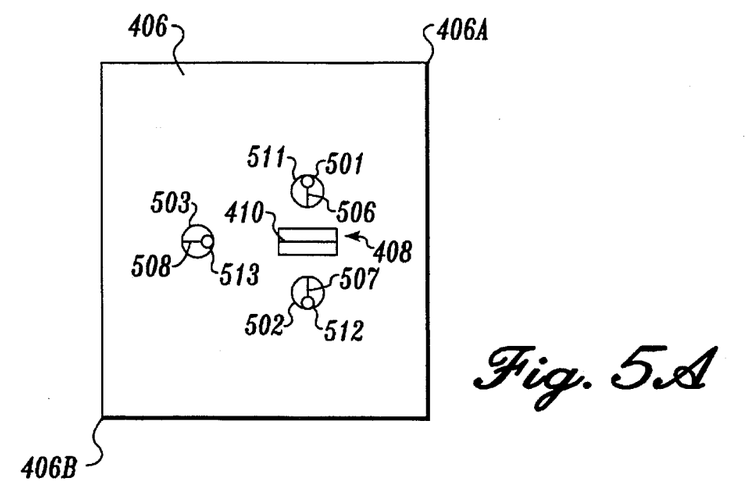
FIGS. 5A and 5B, respectively, are face plans of a cover and housing of the monopulse comparator of FIG. 4.
Figure 5B:
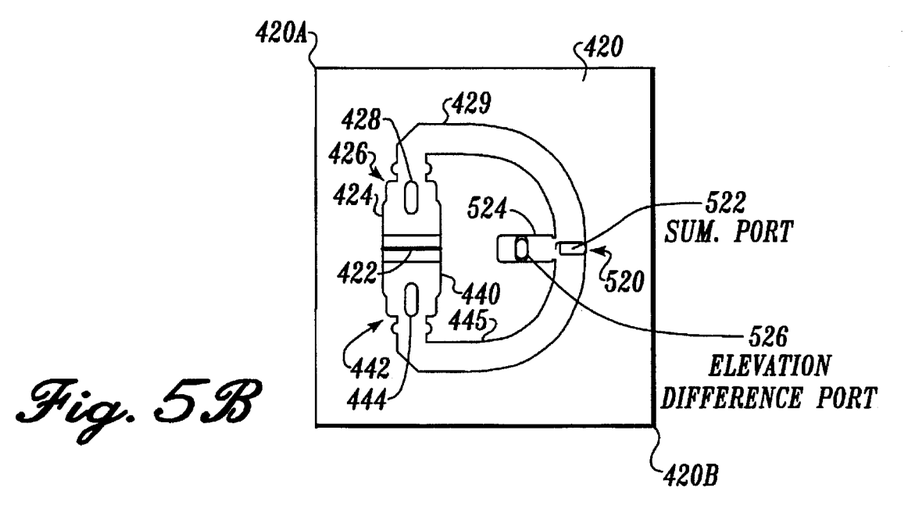

FIGS. 5A and 5B, respectively, are plans of the facing surfaces of cover 406 and housing 420 of the monopulse comparator 400 (FIG. 4). That is, the surfaces shown in FIGS. 5A and 5B are adjacent and face each other when cover 406 is attached to housing 420. The upper right corner 406A of cover 406 (FIG. 5A) is positioned adjacent to upper left corner 420A of housing 420 (FIG. 5B). Similarly, the lower left corner 406B of cover 406 (FIG. 5A) is positioned adjacent to lower right corner 420B of housing 420 (FIG. 5B).

As shown in FIG. 5A, the surface of cover 406 facing housing 420 (FIG. 5B) is substantially planar except for matching-probes 501–503. Matching-probes 501 and 502 are positioned on cover 406 to register with $TE_{2,0}$ mode couplers 426 and 442, respectively. Matching probe 503 is positioned to register with a coupler 520 (described below in conjunction with FIG. 5B) connected to the opposite ends of waveguides 429 and 445. In this embodiment, matching-probes 501–503 are fabricated on buttons (described below in conjunction with FIG. 6) that are fixed to holes made in cover 406. In other embodiments, matching-probes 501–503 may be made directly from the metal plate implementing cover 406. Matching-probes 501–503 include knife-edges 506–508 that extend in a direction perpendicularly away from the surface of cover 406. Knife-edges 506–508 each have a 45° taper in cross-section (i.e., the sides of the knife-edges form a 45° angle). In addition, matching-probes 501–503, respectively, include holes 511–513 extending in a direction perpendicularly into cover 406.

Figure 6:
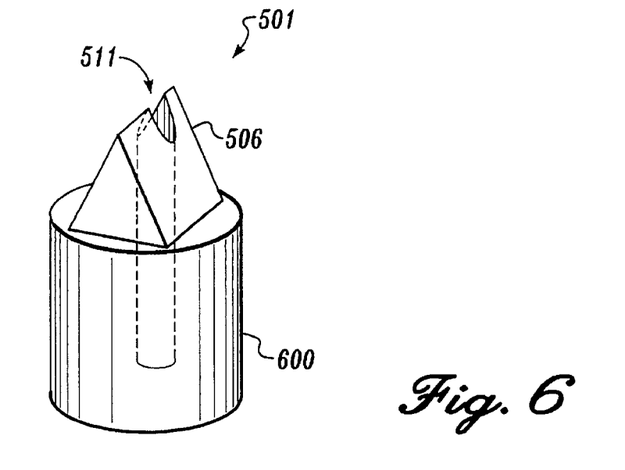
FIG. 6 is a top perspective of a matching-probe according to one embodiment of the present invention.

FIG. 6 is a top perspective of one embodiment of matching-probe 501. Matching-probe 501 is formed on a cylindrical button 600. As shown in phantom in FIG. 6, hole 511 extends perpendicularly through knife-edge 506 and partially through button 600. Knife-edge 506 extends approximately 0.030 inches from the surface of button 600. Although not well understood at this time, hole 511 is believed to balance the electric field lines around the difference port aperture of the magic tee implementing $TE_{2,0}$ mode coupler 426, thereby reducing the return loss of the difference port signal. Matching-probe 502 is substantially similar to matching-probe 501, sized for the $TE_{2,0}$ mode signals. Matching-probe 503, being sized for $TE_{1,0}$ mode signals, is slightly smaller than matching-probe 501.

Referring back to FIG. 5A, cover 406 also includes a rectangular hole perpendicularly through cover 406, which forms waveguide 408. Waveguide 408 extends through cover 406 with a slight taper so that the opening on the surface of cover 406 facing housing 420 is slightly smaller than the surface of cover 406 facing away from housing 420. The tapering in waveguide 408 allows it to support propagation of the $TE_{1,0}$ and $TE_{2,0}$ modes while reflecting undesired higher order modes. Septum 410 extends perpendicularly into cover 406, dividing waveguide 408 into two substantially identical halves. Waveguide 408 is positioned on cover 406 to register with knife-edge 422 (FIG. 5B).

Referring now to FIG. 5B, the surface of housing 420 facing cover 406 is substantially planar, except for recesses formed in housing 420 to implement knife-edge 422 and waveguides 424, 429, 440 and 445 when cover 406 is attached to housing 420. In addition, housing 420 includes a recess to implement a coupler 520 when cover 406 is attached. In this embodiment, coupler 520 is a magic tee. Magic tee 520 is similar to a conventional magic tee, except that magic tee 520 includes matching-probe 503 (FIG. 5A) instead of a conventional matching-probe. As described above in conjunction with FIG. 6, matching-probe 503 gives magic tee 520 improved return loss performance compared to conventional magic tees.

Magic tee 520 is connected to waveguides 429 and 445 to receive in its feeds the $T_{1,0}$ mode component signals propagated from $TE_{2,0}$ mode couplers 426 and 442. Waveguides 429 and 445 provide substantially symmetrical curved propagation paths between magic tee 520 and $TE_{2,0}$ mode couplers 426 and 442, respectively. Thus, waveguides 429 and 445 propagate the $TE_{1,0}$ mode component signals of the first-half and second-half signals, respectively, to magic tee 520. Magic tee 520 receives the $TE_{1,0}$ mode component signals and separates the $\Sigma$ and $\Delta EL$ signals, propagating the $\Sigma$ signal in its sum port and the $\Delta EL$ signal in its difference port.

The sum port 522 of magic tee 520 extends perpendicularly into and through housing 420. Sum port 522 is approximately 0.224 inches wide. The difference port 524 of magic tee 520 extends within the plane of waveguides 429 and 445 perpendicularly toward knife-edge 422. A conventional non-champhered E-plane bend 526, formed in and through housing 420, is connected to difference port 524 to propagate signals from difference port 524 perpendicularly through and out of housing 420. The port of bend 526 providing the propagation path through housing 430 is approximately 0.224 inches wide.

Waveguides 429 and 445 are the longest waveguides in monopulse comparator 400, but are relatively short compared to the longest waveguides in some conventional planar monopulse comparators. Consequently, waveguides 429 and 445 require less area and are easier to match than the waveguides in these conventional planar monopulse comparators.

As described above, all of the signals output from housing 420 (i.e., the $TE_{2,0}$ mode signals from $TE_{2,0}$ mode couplers 426 and 442, and the sum and difference port signals from magic tee 520) propagate out of housing 420 in a direction perpendicularly away from cover 406 and toward circuit substrate 430 (FIG. 4). Because all of the waveguide signals are propagated perpendicularly out of housing 420, transition of the waveguide signals to microstrip signals is facilitated in circuit substrate 430. Thus, this embodiment allows monopulse comparator 400 to be smaller in size and thickness than many conventional monopulse comparators of comparable performance.

Referring to FIGS. 4–5B, monopulse comparator 400 operates to extract the $\Sigma$ and $\Delta EL$ signals as follows. Horn 402 receives the incoming RF signal and propagates it to waveguide 408. Septum 410 in waveguide 408 separates the incoming RF signal into a first-half signal and a second-half signal, corresponding to the upper and lower halves of horn 402, respectively. The first-half signal and the second-half signal are then respectively propagated through oversized waveguides 424 and 440 to $TE_{2,0}$ mode couplers 426 and 442. $TE_{2,0}$ mode couplers 426 and 442 pass the $TE_{1,0}$ mode component signals of the first-half and second-half signals to waveguides 429 and 445, respectively. Waveguides 429 and 445 respectively propagate the $TE_{1,0}$ mode component signals of the first-half signal and the second-half signal to magic tee 520. Magic tee 520 then separates out the $\Sigma$ and $\Delta EL$ signals from the $TE_{1,0}$ mode component signals, as in the manner of a conventional magic tee. Matching-probe 503 in magic tee 520 reduces the return loss of the $\Sigma$ signal. The $\Sigma$ and $\Delta EL$ signals are then transitioned to microstrip by waveguide-to-microstrip transition circuits (described below in conjunction with FIG. 8).

Monopulse comparator 400 extracts the $\Delta AZ$ signal as follows. As is well known, unsymmetric modes, such as the $TE_{2,0}$ mode of an incoming RF signal, cannot be excited in the receiving antenna unless the incoming RF signal is misaligned with the antenna's boresight. The amplitude of the excited unsymmetric mode energy is dependent on the angle the incoming RF signal impinges the antenna relative to the antenna's boresight.

Alter the first-half signal and the second-half signal are propagated to $TE_{2,0}$ mode couplers 426 and 442 as described above, $TE_{2,0}$ mode couplers 426 and 442 respectively separate the $TE_{2,0}$ mode component signals of the first-half signal and the second-half signal. Each $TE_{2,0}$ mode component signal inherently carries the $\Delta AZ$ information (as described above) of its corresponding half (i.e., the upper or lower half) of the incoming RF signal. Waveguide-to-microstrip transition circuits 432 and 446 then transition the energy of $TE_{2,0}$ mode component signals to microstrip.

Figure 7:
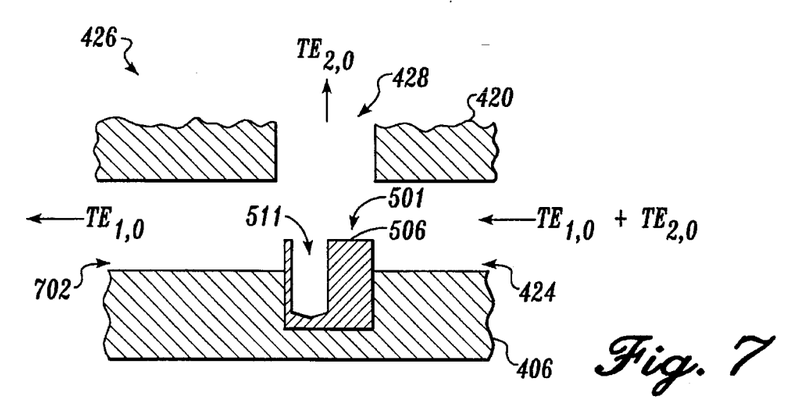
FIG. 7 is a vertical section of a $TE_{2,0}$ mode coupler of the monopulse comparator of FIG. 4.

FIG. 7 is a vertical section of one embodiment of $TE_{2,0}$ mode coupler 426. $TE_{2,0}$ mode coupler 426 is implemented with a folded magic tee. Folded magic tee structures are well known. $TE_{1,0}$ mode component signals, being symmetric, pass through $TE_{2,0}$ mode coupler 426 to port 702. In contrast, $TE_{2,0}$ mode component signals, being unsymmetric, are separated by $TE_{2,0}$ mode coupler 426 and propagated in port 428.

Figure 8:
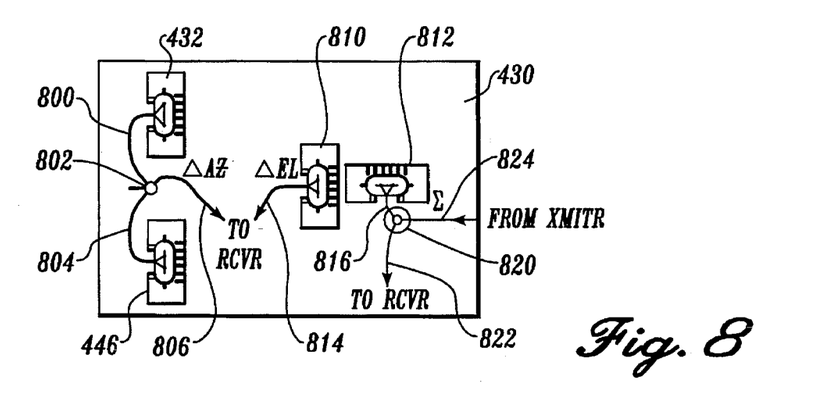
FIG. 8 is a top plan of a circuit substrate of the monopulse comparator of FIG. 4.

FIG. 8 is a top plan of circuit substrate 430 (FIG. 4). Circuit substrate 430 includes waveguide-to-microstrip transition circuit 432 positioned to register with port 428 (FIG. 7) when circuit substrate 430 is attached to housing 420 (FIG. 4). Waveguide-to-microstrip transition circuit 432 is located on the surface of circuit substrate 430 facing housing 420. As describe above in conjunction with FIG. 4, waveguide-to-microstrip transition circuit 432 transitions the $TE_{2,0}$ mode component signal (from the first-half signal) from a waveguide signal to a microstrip signal propagated on microstrip line 800. Microstrip line 800 is connected to an input lead of a power combiner 802. In this embodiment, power combiner 802 is a rat race power combiner photolithographically formed on circuit substrate 430. Rat race power combiners are well known in the art.

Circuit substrate 430 also includes waveguide-to-microstrip transition circuit 446 that is substantially similar to waveguide-to-microstrip transition circuit 432. Waveguide-to-microstrip transition circuit 446 transitions the $TE_{2,0}$ mode component signal (from the second-half signal) from a waveguide signal to a microstrip signal propagated on a microstrip line 804. Microstrip line 804 is connected to the other input lead of power combiner 802. Power combiner 802 outputs the combined $TE_{2,0}$ mode component signals to form the $\Delta AZ$ signal, which is propagated on a microstrip line 806. Microstrip line 806 is coupled to the receiver (not shown) of the monopulse antenna system.

Circuit substrate 430 also includes waveguide-to-microstrip transition circuits 810 and 812, which are substantially similar to waveguide-to-microstrip transition circuit 432. Waveguide-to-microstrip transition circuits 810 and 812 are positioned on circuit substrate 430 to register with bend 526 (FIG. 5B) and sum port 522 of magic tee 520 (FIG. 5B), respectively, when circuit substrate 430 is attached to housing 420 (FIG. 5B). Waveguide-to-microstrip transition circuits 810 and 812 provide the $\Delta EL$ and $\Sigma$ signals on microstrip lines 814 and 816, respectively. Microstrip line 814 is also connected to the receiver (not shown), thereby providing the $\Delta EL$ signal to the receiver. Microstrip line 816 is connected to a circulator 820, which routes the $\Sigma$ signal to the receiver (not shown) through a microstrip line 822 connected between circulator 820 and the receiver. Circulator 820 is also connected to a microstrip line 824, which is coupled to a transmitter (not shown). Accordingly, the transmitter provides the transmit pulse that is transmitted through monopulse comparator 400 (FIG. 4) and horn 402 (FIG. 4) to be reflected from the target back to horn 402 as the incoming RF signal.

Figure 9A:
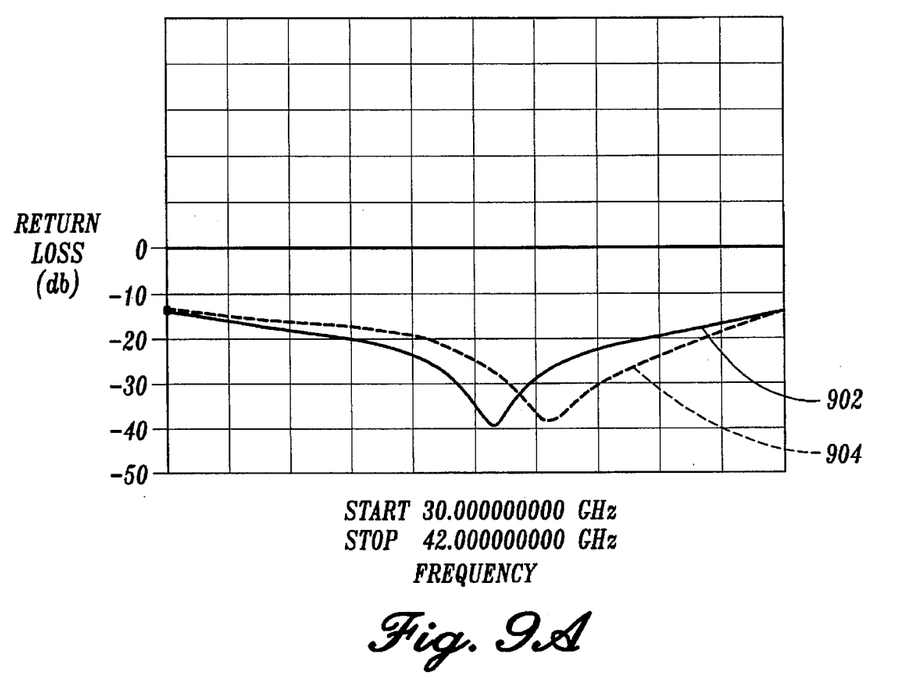
FIGS. 9A and 9B are graphs displaying return loss measurements of the elevation difference port and the sum port of a monopulse comparator according to one embodiment of the present invention.
Figure 9B:
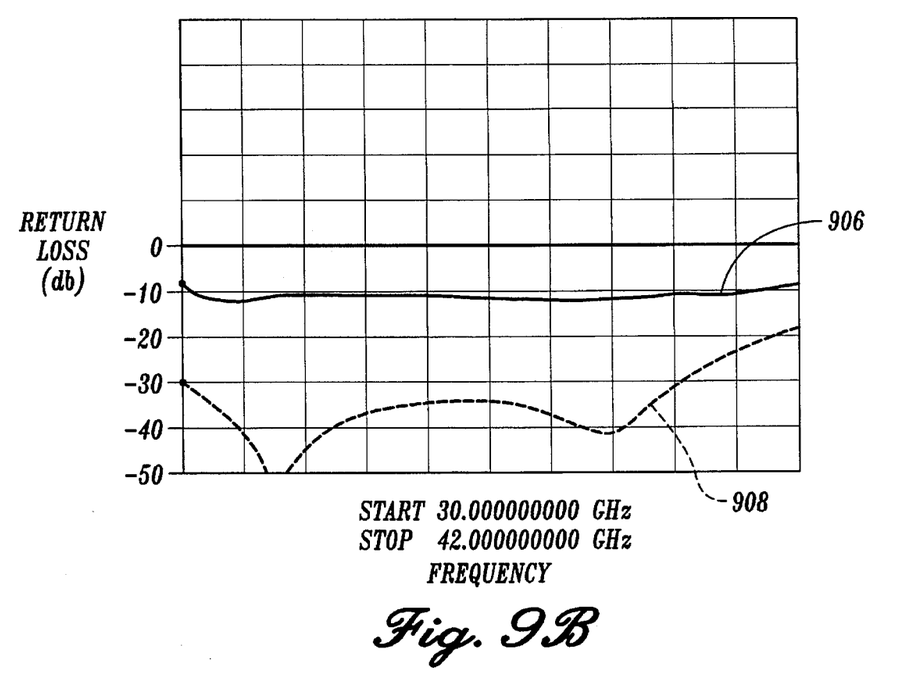

FIGS. 9A and 9B, respectively, are graphs displaying return loss measurements of the $\Delta EL$ port and the $\Sigma$ port of monopulse comparator 400 (FIG. 4) and a substantially similar monopulse comparator having conventional matching-probes (i.e., without holes in the matching-probes). In FIG. 9A, curve 902 indicates the return loss for the ΔEL port of the monopulse comparator with conventional matching-probes over a frequency ranges of 30–42 GHz. Curve 904 indicates the return loss for the ΔEL port of monopulse comparator 400 over the same frequency range. The return loss for both monopulse comparators are similar, with the matching-probes with holes appearing to shift the frequency of the minimum return loss approximately 1.2 GHz.

In FIG. 9B, curve 906 indicates the return loss of the Σ port of the monopulse comparator with conventional matching-probes. Curve 908 indicates the return loss of the Σ port of monopulse comparator 400. As seen in FIG. 9B, monopulse comparator 400 has a return loss in the Σ port approximately 10–40 dB lower than the monopulse comparator with conventional matching-probes.

The embodiments of the invention described above are illustrative of the principles of the invention and are not intended to limit the invention to the particular embodiments described. For example, other embodiments can use waveguide-to-stripline transitions instead of the waveguide-to-microstrip transitions described. In addition, those skilled in the art of monopulse comparators easily modify the described embodiments without undue experimentation so that the $TE_{2,0}$ mode of the incoming RF signals contains the elevation difference information instead of the azimuth difference information. While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A structure for use with an antenna receiving an incoming radio frequency (RF) signal, said antenna including a first half and a second half and configured to support multimode energy propagation, said structure being contained in a package, said structure comprising:

a first waveguide having a first end and a second end, wherein said first end of said first waveguide is adapted to be coupled to said antenna to propagate said incoming RF signal being received by said antenna, and wherein said first waveguide is configured to support multimode energy propagation;

a first coupler having a first feed, a second feed and a third feed, wherein said first feed of said first coupler is coupled to said second end of said first waveguide, and wherein said first coupler is configured to:
propagate said incoming RF signal propagated in said first waveguide,
propagate a first-half signal in said second feed that is dependent on said incoming RF signal as received by said first half of said antenna, and
propagate a second-half signal in said third feed that is dependent on said incoming RF signal as received by said second half of said antenna;

a second waveguide having a first end and a second end, said first end of said second waveguide being coupled to said second feed of said first coupler, said second waveguide configured to propagate said first-half signal propagated in said first coupler;

a second coupler having a first feed, a second feed, and a third feed, said first feed of said second coupler being coupled to said second end of second waveguide, wherein said second coupler is configured to:
propagate in said first feed of said second coupler said first-half signal propagated in said second waveguide,
propagate in said second feed of said second coupler a signal that is dependent on an unsymmetrical mode component signal of said first-half signal, and
propagate in said third feed of said second coupler a symmetrical mode signal that is dependent on a symmetrical mode component signal of said first-half signal;

a third waveguide having a first end and a second end, said first end of said third waveguide being coupled to said third feed of said first coupler, said third waveguide configured to propagate said second-half signal propagated in said first coupler;

a third coupler having a first feed, a second feed and a third feed, said first feed of said third coupler being coupled to said second end of said third waveguide, wherein said third coupler is configured to:
propagate in said first feed of said third coupler said second-half signal propagated in said third waveguide,
propagate in said second feed of said third coupler a signal that is dependent on an unsymmetrical mode component signal of said second-half signal, and
propagate in said third feed of said third coupler a symmetrical mode signal that is dependent on a symmetrical mode component signal of said second-half signal;

a fourth waveguide having a first end and a second end, said first end of said fourth waveguide being coupled to said third feed of said second coupler, wherein said fourth waveguide is configured to propagate said symmetrical mode signal propagated in said third feed of said second coupler;

a fifth waveguide having a first end and a second end, said first end of said fifth waveguide being coupled to said third feed of said third coupler, wherein said fifth waveguide is configured to propagate said symmetrical mode signal propagated in said third feed of said third coupler; and a fourth coupler having first, second, third and fourth feeds, said first feed of said fourth coupler being coupled to said second end of said fourth waveguide, said second feed of said fourth coupler being coupled to said second end of said fifth waveguide, wherein said third feed of said fourth coupler is configured to propagate a signal that is dependent on a sum of said symmetrical mode signals propagated in said fourth and fifth waveguides, and said fourth feed of said fourth coupler is configured to propagate an output signal that is dependent on a difference between said symmetrical mode signals propagated in said fourth and fifth waveguides.

2. The structure recited in claim 1 further comprising a bend coupled to said fourth feed of said fourth coupler, wherein said bend is configured to cause a change in a direction of said signal propagated in said fourth feed of said fourth coupler.

3. The structure recited in claim 1 wherein said second, third and fourth couplers each comprise a magic tee.

4. The structure recited in claim 3 wherein said magic tees of said second and third couplers are folded magic tees.

5. The structure recited in claim 3 wherein said magic tees of said second, third and fourth couplers each comprise a matching-probe.

6. The structure recited in claim 5 wherein said matching-probes of said magic tees each has a hole.

7. The structure recited in claim 1 wherein said unsymmetrical and symmetrical modes of said first-half signal are $TE_{2,0}$ and $TE_{1,0}$ modes, respectively.

8. The structure recited in claim 1 wherein said first, second, third, fourth and fifth waveguides are integrated into said package.

9. The structure recited in claim 1 wherein said first end of said first waveguide is adapted to be attached to a multimode horn antenna.

10. A structure for use with an antenna receiving an incoming radio frequency (RF) signal, said antenna including a first half and a second half and configured to support multimode energy propagation, said structure being contained in a package, said structure comprising:

a first waveguide having a first end and a second end, wherein said first end of said first waveguide is adapted to be coupled to said antenna to propagate said incoming RF signal being received by said antenna, and wherein said first waveguide is configured to support multimode energy propagation;

a first coupler having a first feed, a second feed and a third feed, wherein said first feed of said first coupler is coupled to said second end of said first waveguide, and wherein said first coupler is configured to:
propagate said incoming RF signal from said first waveguide,
propagate a first-half signal in said second feed that is dependent on said incoming RF signal as received by said first half of said antenna, and
propagate a second-half signal in said third feed that is dependent on said incoming RF signal as received by said second half of said antenna;

a second waveguide having a first end and a second end, said first end of said second waveguide being coupled to said second feed of said first coupler, said second waveguide configured to propagate said first-half signal propagated in said first coupler;

a second coupler having a first feed, a second feed, and a third feed, said first feed of said second coupler being coupled to said second end of second waveguide, wherein said second coupler is configured to:
propagate in said first feed of said second coupler said first-half signal propagated in said second waveguide,
propagate in said second feed of said second coupler a signal that is dependent on an unsymmetrical mode component signal of said first-half signal, and
propagate in said third feed of said second coupler a signal that is dependent on a symmetrical mode component signal of said first-half signal;

a third waveguide having a first end and a second end, said first end of said third waveguide being coupled to said third feed of said first coupler, said third waveguide configured to propagate said second-half signal propagated in said first coupler;

a third coupler having a first feed, a second feed and a third feed, said first feed of said third coupler being coupled to said second end of third waveguide, wherein said third coupler is configured to:
propagate in said first feed of said third coupler said second-half signal propagated in said third waveguide;
propagate in said second feed of said third coupler a signal that is dependent on an unsymmetrical mode component signal of said second-half signal, and
propagate in said third feed of said third coupler a signal that is dependent on a symmetrical mode component signal of said second-half signal;

a fourth waveguide having a first end and a second end, said first end of said fourth waveguide coupled to said third feed of said second coupler;

a fifth waveguide having a first end and a second end, said first end of said fifth waveguide coupled to said third feed of said third coupler;

a fourth coupler having first, second, third and fourth feeds, said first feed of said fourth coupler coupled to said second end of said fourth waveguide, said second feed of said fourth coupler coupled to said second end of said fifth waveguide, wherein said third feed of said fourth coupler is capable of propagating a signal that is dependent on a sum of said signals propagated in said fourth and fifth waveguides, and said fourth feed of said fourth coupler is capable of propagating an output signal that is dependent on a difference between said signals propagated in said fourth and fifth waveguides;

a bend coupled to said fourth feed of said fourth coupler, wherein said bend is configured to cause a change in a direction of said signal propagated in said fourth feed of said fourth coupler; and a substrate comprising:
a first waveguide-to-trace transition circuit coupled to said second coupler, wherein said first waveguide-to-trace transition circuit is configured to output a signal that is dependent on said unsymmetrical mode component signal of said first-half signal onto a first trace routed on said substrate;
a second waveguide-to-trace transition circuit coupled to said third coupler, wherein said second waveguide-to-trace transition circuit is configured to output a signal that is dependent on said unsymmetrical mode component signal of signal of said second-half signal onto a second trace routed on said substrate;
a third waveguide-to-trace transition circuit coupled to said third feed of said fourth coupler, wherein said third wave-to-trace transition circuit is configured to output a signal that is dependent on said signal propagated by said third feed of said fourth coupler onto a third trace routed on said substrate;
a fourth waveguide-to-trace transition circuit coupled to said bend, wherein said fourth waveguide-to-trace transition circuit is configured to output a signal that is dependent on said signal propagated by said fourth feed of said fourth coupler onto a fourth trace routed on said substrate.

11. The structure recited in claim 10 further comprising a circulator coupled to said fourth trace, wherein said circulator is configured to propagate a RF signal from a transmitter to said fourth waveguide-to-trace transition circuit.

12. The structure recited in claim 10 further comprising a power combiner coupled to said first and second traces.

13. The structure recited in claim 12 wherein said power combiner comprises a rat race power combiner.

14. The structure recited in claim 10 wherein said first, second, third and fourth traces each comprise a microstrip.

15. The structure recited in claim 10 wherein said first, second, third and fourth traces each comprise a stripline.

16. A structure for use with an antenna receiving an incoming radio frequency (RF) signal, said antenna including a first half and a second half and capable of supporting multimode energy propagation, said structure contained in a package, said structure comprising:

first propagation means, coupled to said antenna, for propagating multimode component signals of said incoming RF signal being received by said antenna;

first coupler means, coupled to said first propagation means, for propagating a first-half signal that is dependent on said incoming RF signal as received by said first half of said antenna and a second-half signal that is dependent on said incoming RF signal as received by said second half of said antenna;

second propagation means, coupled to said first coupler means, for propagating said first-half signal;

second coupler means, coupled to said second propagation means, for propagating a first signal that is dependent on an unsymmetrical mode component signal of said first-half signal and propagating a second signal that is dependent on a symmetrical mode component signal of said first-half signal;

third propagation means, coupled to said first coupler means, for propagating said second-half signal;

third coupler means, coupled to said third propagation means, for propagating a third signal that is dependent on an unsymmetrical mode component signal of said second-half signal and propagating a fourth signal that is dependent on a symmetrical mode component signal of said second-half signal;

fourth propagation means, coupled to said second coupler means, for propagating said second signal propagated by said second coupler means;

fifth propagation means, coupled to said third coupler means, for propagating said fourth signal propagated by said third coupler means; and fourth coupler means, coupled to said fourth and fifth propagation means, for propagating a fifth signal that is dependent on a sum of said second and fourth signals respectively propagated in said fourth and fifth propagation means and propagating a sixth signal that is dependent on a difference between said second and fourth signals respectively propagated in said fourth and fifth propagation means, wherein said second and fourth signals are symmetrical mode signals.

17. The structure recited in claim 16 wherein said first, second, third, fourth and fifth propagation means are integrated into said package.

18. The structure recited in claim 16 wherein said unsymmetrical and symmetrical modes of said first-half signal are $TE_{2,0}$ and $TE_{1,0}$ modes, respectively.

19. The structure recited in claim 16 wherein said second, third and fourth coupler means each comprise a magic tee.

20. A structure for use with an antenna receiving an incoming radio frequency (RF) signal, said antenna including a first half and a second half and capable of supporting multimode energy propagation, said structure contained in a package, said structure comprising:

first propagation means, coupled to said antenna, for propagating multimode component signals of said incoming RF signal being received by said antenna;

first coupler means, coupled to said first propagation means, for propagating a first-half signal that is dependent on said incoming RF signal as received by said first half of said antenna and a second-half signal that is dependent on said incoming RF signal as received by said second half of said antenna;

second propagation means, coupled to said first coupler means, for propagating said first-half signal;

second coupler means, coupled to said second propagation means, for propagating a first signal that is dependent on an unsymmetrical mode component signal of said first-half signal and propagating a second signal that is dependent on a symmetrical mode component signal of said first-half signal;

third propagation means, coupled to said first coupler means, for propagating said second-hall signal;

third coupler means, coupled to said third propagation means, for propagating a third signal that is dependent on an unsymmetrical mode component signal of said second-half signal and propagating a fourth signal that is dependent on a symmetrical mode component signal of said second-half signal;

fourth propagation means, coupled to said second coupler means, for propagating said second signal propagated by said second coupler means;

fifth propagation means, coupled to said third coupler means, for propagating said fourth signal propagated by said third coupler means;

fourth coupler means, coupled to said fourth and fifth propagation means, for propagating a fifth signal that is dependent on a sum of said second and fourth signals respectively propagated in said fourth and fifth propagation means and propagating a sixth signal that is dependent on a difference said second and fourth signals respectively propagated in said fourth and fifth propagation means; and a substrate comprising:
a first waveguide-to-trace transition circuit coupled to said second coupler means, wherein said first waveguide-to-trace transition circuit outputs a signal that is dependent on said first signal propagated by said second coupler means onto a first trace routed on said substrate;

a second waveguide-to-trace transition circuit coupled to said third coupler, wherein said second waveguide-to-trace transition circuit outputs a signal that is dependent on said third signal propagated by said third coupler onto a second trace routed on said substrate;

a third waveguide-to-trace transition circuit coupled to said fourth coupler means, wherein said third wave-to-trace transition circuit outputs a signal that is dependent on said fifth signal propagated by said fourth coupler means onto a third trace routed on said substrate;

a fourth waveguide-to-trace transition circuit coupled to said fourth coupler means, wherein said fourth waveguide-to-trace transition circuit outputs a signal that is dependent on said sixth signal propagated by said fourth coupler means onto a fourth trace routed on said substrate.

21. The structure recited claim 20 further comprising a bend, said coupling said fourth coupler means to said fourth waveguide-to-trace transition circuit.

22. The structure recited in claim 20 further comprising a power combiner coupled to said first and second traces.

23. The structure recited in claim 20 wherein said first, second, third and fourth traces each comprise a microstrip.

* * * * *